United States Patent [19]

Furuhata et al.

[11] 4,301,395

[45] Nov. 17, 1981

[54] PHASE-LOCK CONTROL DEVICE

[75] Inventors: Takashi Furuhata; Yasunori Kobori, both of Yokohama, Japan

[73] Assignee: Hitachi, Ltd., Tokyo, Japan

[21] Appl. No.: 895,065

[22] Filed: Apr. 10, 1978

[30] Foreign Application Priority Data

Apr. 11, 1977 [JP] Japan .................. 52/40371

[51] Int. Cl.³ .............................................. H02P 5/16
[52] U.S. Cl. ..................................... 318/314; 318/318; 318/327
[58] Field of Search ............... 318/314, 318, 327, 391, 318/430, 431, 398, 400, 341

[56] References Cited

U.S. PATENT DOCUMENTS

| | | | |
|---|---|---|---|
| 3,309,597 | 3/1967 | Gabor et al. | 318/400 |
| 3,621,353 | 11/1971 | Matley | 318/314 |
| 3,780,364 | 12/1973 | Henderson | 318/391 |
| 4,008,424 | 2/1977 | Bompani | 318/327 |
| 4,080,555 | 3/1978 | Kawada | 318/318 |
| 4,081,728 | 3/1978 | Nikami et al. | 318/318 |

Primary Examiner—David Smith, Jr.
Attorney, Agent, or Firm—Craig and Antonelli

[57] ABSTRACT

A control device for phase-locking a rotating or traveling member to a reference signal within a short time at its starting stage, in which a phasic error signal produced as a result of comparison of the phases of the reference signal and a signal representative of the phasic position of the member is fed to the driver of the member through a gate which is non-conductive unless the speed of motion of the member reaches a predetermined value.

9 Claims, 9 Drawing Figures

PHASE-LOCK CONTROL DEVICE

LIST OF PRIOR ART REFERENCES (37 CFR 1.56(a))

The following references are cited to show the state of the art:
Japanese Patent Publication No. 15629/72 (Hitachi, Ltd.) published on May 10, 1972.

BACKGROUND OF THE INVENTION

This invention relates to a phase-lock control device in which a rotating member or traveling member is phase-locked to a reference signal.

In a phase-lock control device in which a rotating member such as a motor or a traveling member such as a record medium tape is phase-locked to a reference signal, it has hitherto been essential to shorten the lock-in time at the starting stage of that member. Some known phase-lock control devices are defective in that there needs a complicated circuit or it is impossible to improve the starting control without somewhat sacrificing the phase-lock control in the steady state, thereby somewhat degrading the overall control of the traveling or rotating member.

SUMMARY OF THE INVENTION

An object of this invention is to provide a phase-lock control device which can phase-lock a rotating member or traveling member to a reference signal within a short time at its starting stage.

Another object of this invention is to provide a simple phase-lock control device which can reduce the lock-in time of the rotating member or traveling member.

According to this invention, these objects can be accomplished by isolating a rotating member or traveling member from speed fluctuating components or phase fluctuating components which occur during a time interval ranging from a starting point of the member to a time at which the member reaches a predetermined speed of motion, so that a rapid lock-in of the member can be ensured.

BRIEF DESCRIPTION OF THE DRAWINGS

FIGS. 6b and 7b are wave diagrams of the outputs of the generators shown in FIGS. 6a and 7a.

DESCRIPTION OF THE PREFERRED EMBODIMENTS

Before describing the invention, a prior art phase-lock control device will first be described with reference to FIGS. 1 and 2 for a better understanding of the invention.

Figure 1:
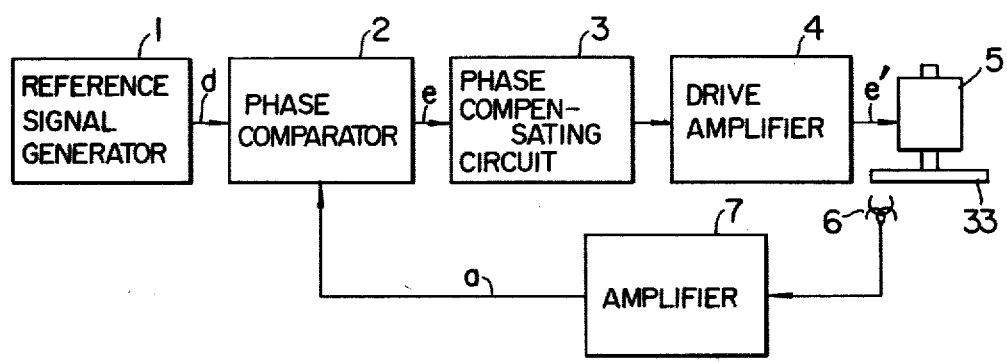
FIG. 1 is a block diagram of a prior art phase-lock control device.

In a prior art phase-lock control device as diagramatically shown in FIG. 1, reference numeral 5 denotes a rotating member such as for example a motor with a flywheel 33, which member rotates with a drive signal $e'$. A detector 6 is located in the vicinity of the fly-wheel 3 which rotates synchronously with the motor 5 so that the phase of rotation of the motor 5 is detected by the detector 6. An output signal of the detector 6, that is, a signal representative of a phasic position of the rotating member (or traveling member) in motion is shaped and amplified at an amplifier 7, as designated at a, and is then fed to one input terminal of a phase comparator 2. The phase comparator 2 has its other input terminal supplied with an output signal d of a reference signal generator 1 so as to compare phases of the two input signals. A output of the phase comparator 2 or a phasic error signal e is fed via a phase compensating circuit 3 to a drive amplifier 4 which in turn produces the motor drive signal $e'$. Consequently, the rotary phase of the motor is corrected as motor acceleration proceeds.

Figure 2:
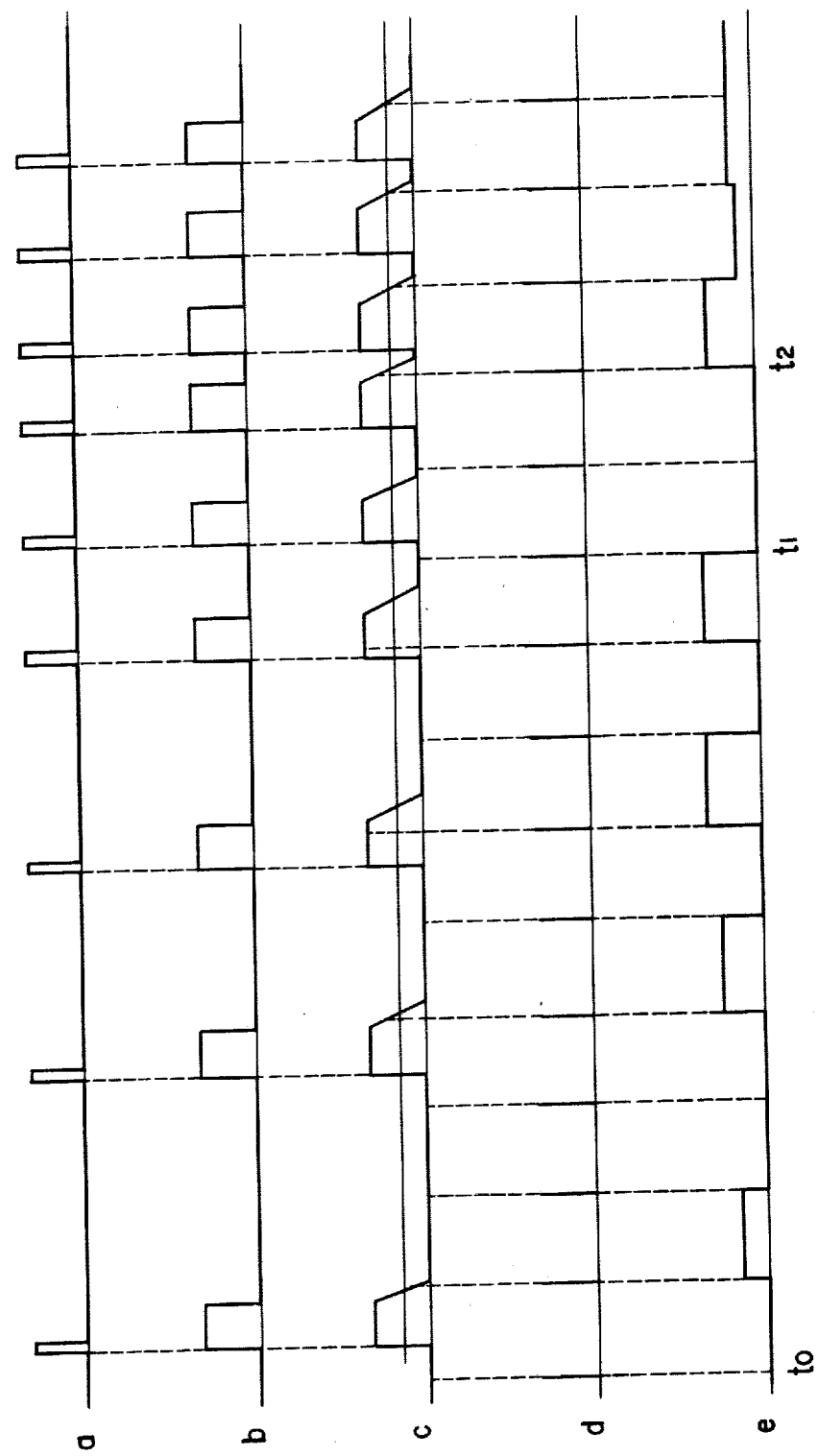
FIG. 2 is a simplified waveform diagram of signals appearing at some parts of the device shown in FIG. 1.

Turning to FIG. 2, it will be seen that concurrently with the starting of motor 5 at time $t_o$, a reference signal d is fed from the generator 1 to the other terminal of the phase comparator 2 on the one hand and a phase detection signal a resulting from the rotational speed of the motor 5 increasing with the lapse of time on the other hand is supplied to the one terminal of the phase comparator 2. This phase comparator 2 may include a sample and hold circuit and a frustum-shaped wave generator circuit having a monostable multivibrator and a bootstrap circuit, for example. The phase detection signal a is first converted to a signal b and is then to an ultimate frustum-shaped wave c by the frustum-shaped wave generator circuit. The sample and hold circuit in the phase comparator 2 samples the signal c with the reference signal d and holds the sampled value for a predetermined period. As a result, phasic error signal e representative of a phase difference between the reference signal d and phase detection signal a is obtained. As will be seen from the figure, during a time interval ranging from the starting point of motor 5 at time $t_o$ to time $t_1$ at which the motor reaches a predetermined speed, the phasic error signal e fluctuates frequently on account of unstable rotary phases which the motor 5 assumes. The fluctuating components in the phasic error signal e herein described are thus incorporated into the drive signal $e'$ which is used to bring the motor 5 into its synchronous speed. As a consequence, the rotation of the motor 5 is subjected to various fluctuations, which brings about prolongation of the lock-in time. Following time $t_2$ at which the phase control effect is going to prevail, a period of time lapses before attainment of the completion of the lock-in and thereafter the motor 5 will rotate in synchronism with the signal d.

The invention will now be described by way of an example with reference to FIGS. 3 and 4 in which like reference numerals and symbols designate like parts in FIGS. 1 and 2.

Figure 3:
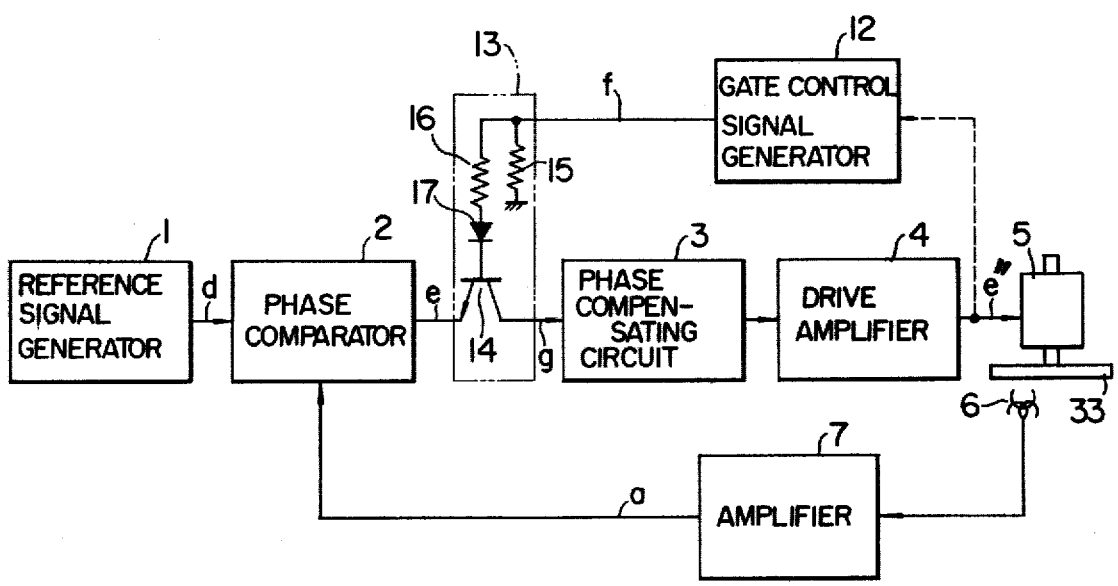
FIG. 3 is a block diagram of an embodiment of the phase-lock control device according to the invention.

In a phase-lock control device embodying the invention shown in FIG. 3, numeral 13 denotes a gate circuit interposed between a phase comparator 2 and a phase compensating circuit 3, whereby a phasic error signal e is fed to the phase compensating circuit 3 via the gate circuit 13. This gate circuit 13 may include a transistor 14 of NPN type, a protective diode 17 having its cathode connected to the base of the transistor 14, a resistor 16 having one end connected to the anode of the diode 17, and a resistor 15 connected between the other end of the resistor 16 and the ground. The transistor 14 has its emitter receiving the phasic error signal e and its collector delivering an output signal g responsive to the signal e. The gate circuit 13 is operative to respond to a gate control signal f from a gate control signal generator 12 when a motor 5 reaches a predetermined rotating speed. The signal f is fed to the junction between the resistors 15 and 16. Remaining parts are not detailed herein since their structure and arrangement may be similar to those of FIG. 1.

In operation, the motor 5 is started and a reference signal d (FIG. 2) from the generator 1 is fed to the phase comparator 2. The phase comparator 2 also receives a phase detection signal a from the detector 6 via the amplifier 7 to produce a phasic error signal e. The gate control signal generator 12 supplies to the gate circuit 13 a gate control signal which assumes a first level (low level) during a time interval ranging from the starting point $t_o$ of the motor 5 to time $t_1'$ at which the motor reaches a predetermined rotating speed and assumes a second level (high level) from time $t_1'$ on, as shown at f in FIG. 4. Accordingly, the gate circuit 13 is non-conductive over the time interval from the starting point $t_o$ of the motor 5 to the time $t_1'$ but is conductive from time $t_1'$ on. Therefore, it follows that during the time interval from starting point $t_o$ of the motor 5 to the time $t_1$, fluctuating portions of the phasic error signal e from the phase comparator 2 similar to, for example, those occurring between times $t_o$ and $t_1$ of the signal e shown in FIG. 2, are prevented from being sent to the phase compensating circuit 3 whereas a fixed voltage from constant voltage supply means incorporated in the phase compensating circuit 3 is supplied to the motor 5 via the drive amplifier 4, ensuring that the motor rotating speed rapidly reaches the predetermined value without being affected by such fluctuating components as contained in the signal e in FIG. 2. Thereby, the rise time of the motor 5 (meaning the time interval from starting point $t_o$ to time $t_1'$ at which the predetermined rotating speed is realized) is greatly shortened as compared with the prior art control device wherein the rise time corresponds to the time interval from $t_o$ to $t_1$ of signal e in FIG. 2. With subsequent closure of the phase control loop from $t_2'$ on, a phasic error signal similar to a portion of signal e in FIG. 2 occurring after $t_1$ is allowed to come into the phase compensating circuit 3, thereby the phase controlling of the motor 5 being accomplished. A signal wave form as observed at the input terminal of phase compensating circuit 3 is shown at g in FIG. 4, showing that the phase controlling begins at time $t_1'$ and soon after the lock-in of the motor at time $t_2'$, the synchronous rotation is attained.

Figure 5:
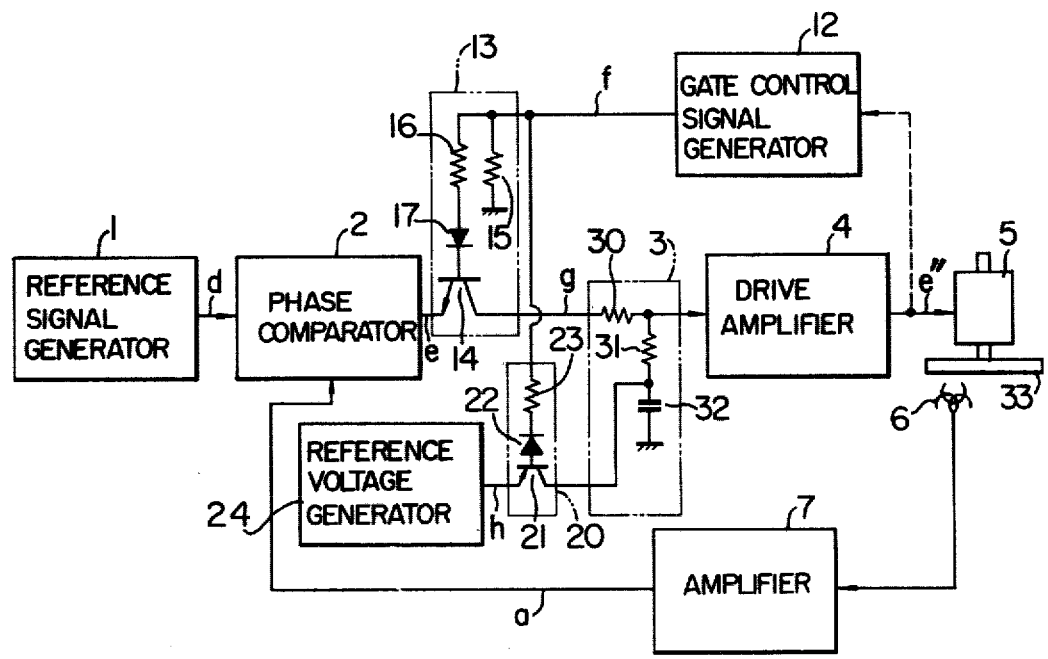
FIG. 5 is a block diagram of another embodiment of the phase-lock control device according to the invention.

Turning to FIG. 5, there is shown another embodiment of the invention in which numeral 20 denotes a second gate circuit through which a reference voltage h is fed from a reference voltage generator 24 to the phase compensating circuit 3. The second gate circuit 20 may include a transistor 21 on PNP type, a protective diode 22 having its anode connected to the base of the transistor 21, and a resistor 23 connected between the cathode of the diode 22 and the output terminal of the gate control signal generator 12. The transistor 21 has its emitter receiving the reference voltage h and its collector connected to the phase compensating circuit 3. The first gate circuit 13 having a similar construction to that in FIG. 3 and the second gate circuit 20 are operative to respond to a gate control signal f from the gate control signal generator 12 when the motor 5 reaches a predetermined rotating speed, the second gate circuit 20 being rendered conductive when the first gate circuit 13 is non-conductive and is rendered nonconductive when the circuit 13 is conductive. The phase compensating circuit 3 may be constituted by, for example, a time constant circuit including a resistor 30 having one end connected to the collector of the transistor 14 in the first gate circuit 13, a resistor 31 having one end connected to the other end of the resistor 30, and a capacitor 32 connected between the other end of the resistor 31 and the ground. The junction between the resistors 30 and 31 is connected to the input terminal of the drive amplifier 4. Connected to the junction between resistor 31 and capacitor 32 is the collector of the transistor 21 in the second gate circuit 20. The time constant circuit 3 taking the form of a so-called phase delay circuit receives the voltage h from the reference voltage generator 24 to produce a voltage across the capacitor 32, which voltage is a center operation voltage which is expected to be applied to the motor 5 when the motor 5 is phase-locked to the reference signal. Remaining parts are not detailed since their lstructure and arrangement may be similar to those of FIG. 3 embodiment.

In the prior art control circuit as shown in FIG. 1 without the reference voltage generator 24 and second gate circuit 20 as well as the first gate circuit, an indeterminate potential built on the capacitor 32 upon the starting of the motor is sometimes added to the motor drive signal e" having a steady operation potential, degrading lock-in characteristics. Thus, this embodiment is effective in suppressing or eliminating the unwanted component and at the same time shortening the lock-in time.

More particularly, until time $t_1'$ (FIG. 4) before which the first gate circuit 13 has been non-conductive with the phase control loop opened, the second gate circuit 20 is kept conductive so that the capacitor 32 is charged to potential of the reference voltage h. When the motor 5 reaches a predetermined rotating speed at time $t_1'$, a gate signal f generated by the generator 12 at that time causes the first gate circuit 13 to be conductive thereby to close the phase control loop and causes the second gate circuit 20 to be non-conductive. Thus, in the subsequent controlling operation, a rapid lock-in will be directed toward the center operation potential as supplied by the capacitor 32 (see signal g in FIG. 4).

In this manner, in addition to a reduction in the rise time (from $t_o$ to $t_1'$), reduction in time elapsing till the lock-in time $t_2'$ considerably improves the lock-in characteristics. After the clsoure of the phase control loop, the second gate circuit 20 is made completely non-conductive so that the capacitor 32 and accordingly controlling operation are completely freed from external disturbances.

Figure 4:
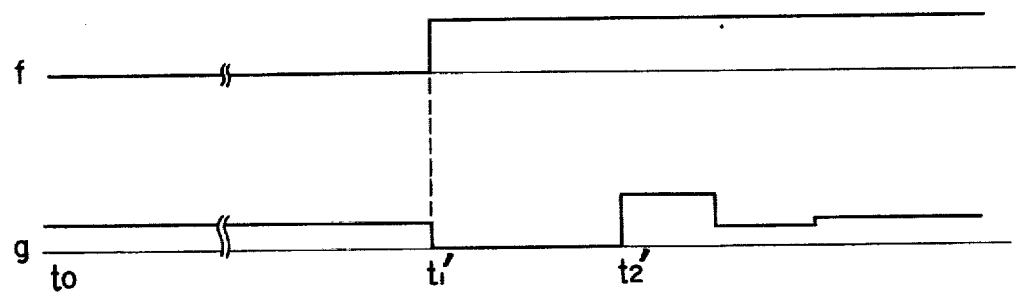
FIG. 4 is a simplified waveform diagram of a gate control signal and a phasic error signal in FIG. 3.
Figure 6A:
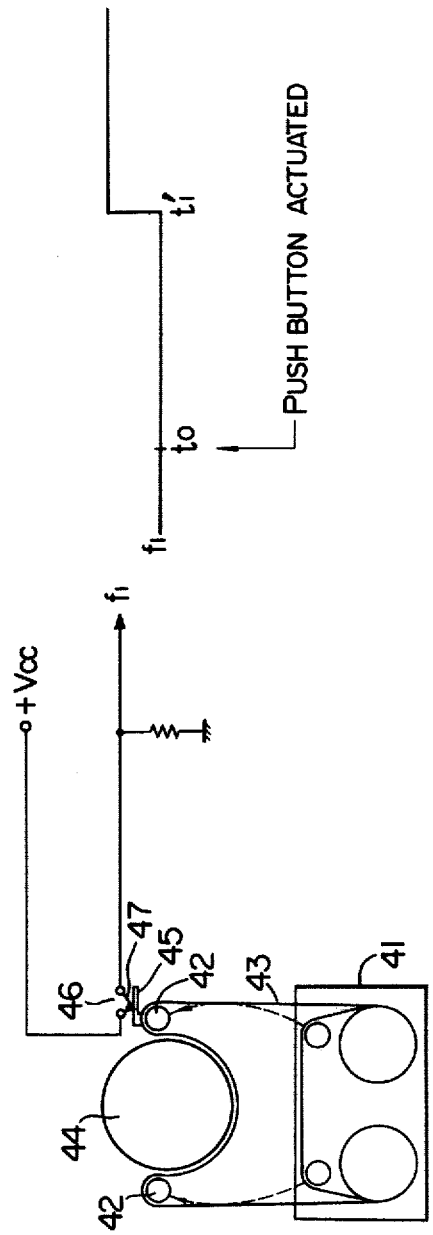
FIGS. 6a and 7a show examples of the gate control signal generator which may be used in the present invention.
Figure 6B:
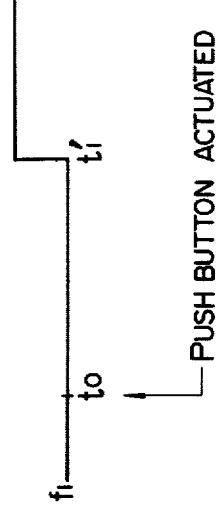

The gate signal f that plays a role in rendering the gate circuit 13 non-conductive till the give time $t_1'$ shown in FIG. 4 may be obtained by many different means. An example is shown in FIG. 6a diagrammatically showing a part of a VTR system, in which when a push button (not shown) is actuated for starting the system, a loading mechanism is operated for causing loading arms 42 to be displaced so as to draw out a magnetic tape 43 from a tape cassette 41 and then loading a cylinder 44 with the tape 43. One of the loading arms 42 is provided with a projection 45 so that upon a displacement of the arm, it pushes the lever 47 of a microswitch 46 to generate a gate control signal $f_1$ as shown in FIG. 6b.

Figure 7A:
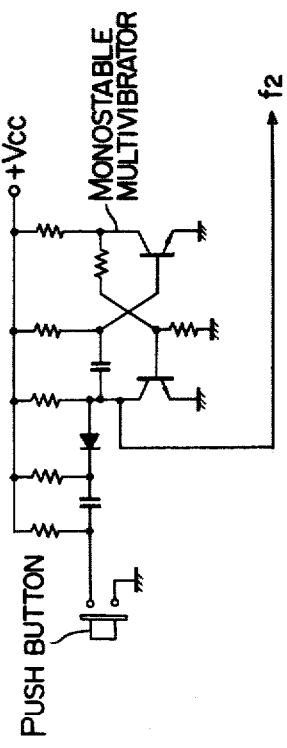
Figure 7B:
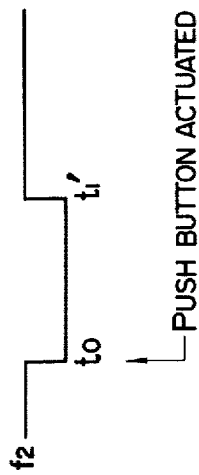

Another example of the gate control signal generator 12 is shown in FIG. 7a, in which a monostable multivibrator is so arranged as to be triggered upon actuation of a push button, so that at a time point $t_1'$, i.e., after a time period $(t_1'-t_o)$ from the actuation of the push button at $t_o$, the multivibrator is automatically inverted to generate a gate control signal $f_2$, as shown in FIG. 7b.

As further attenuatives, after change in the motor drive signal e" sensed through a conductor as depicted by a dotted line in FIGS. 3 and 5 indicates that the motor 5 reaches a predetermined rotating speed, the gate signal f may be produced.

As described above, the phase-lock control device of the invention having the simple construction can considerably reduce the lock-in time at the starting stage of the motor without adversely affecting the controlling characteristics. For example, when applied to a magnetic video signal recording and reproducing apparatus such as VTR, the device according to the invention can improve the apparatus in that the motor-start to reproduction (display) - start time interval can be reduced.

We claim:

1. A control device for phase-locking a rotating member or a traveling member driven by driving means to a reference signal within a short time at the starting state of the member, comprising:
   means associated with said member for producing a phase detection signal representative of the phasic position of said member;
   a phase comparator for comparing the phases of said reference signal and said phase detection signal to produce a phasic error signal depending on the result of the comparison;
   means for producing a control signal indicative of whether the speed of said member reaches a predetermined value; and
   switching means connected with said phase comparator for feeding said phasic error signal through said switching means to said driving means, said switching means being rendered conductive to enable passage of said phasic error signal therethrough or non-conductive to inhibit the passage of said phasic error signal therethrough in response to said control signal so that said phasic error signal is fed to said driving means only after the speed of motion of said member reaches a predetermined value.

2. A device according to claim 1, further comprising:
   a phase compensating circuit connected with the output of said switching means through which said phasic error signal is fed to said driving means, said phase compensating circuit having a charge storing means; a reference signal generator; and second switching means through which said reference signal is supplied to said charge storing means, said charge storing means establishing a center voltage to be applied to said driving means in its steady operation state, said second switching means being rendered non-conductuve in response to said control signal when the first-mentioned switching means is conductive or non-conductive, respectively.

3. A device according to claim 2, in which said phase compensating circuit is constituted by a time constant circuit including at least one capacitor serving as said charge storing means and at least one resistor.

4. a device according to claim 1, in which said phase comparator is constituted by a sample and hold circuit.

5. A device according to claim 1, in which said control signal producing means includes a monostable multivibrator responsive to any signal generated simultaneously with an operation for setting said member in motion.

6. A device according to claim 1, in which said control signal producing means includes a switch responsive to a mechanical movement of a movable member associated with the starting of said rotating or traveling member.

7. A device according to claim 1, further comprising means for generating a reference signal.

8. A device according to claim 1, in which said switching means connected with said phase comparator comprises a transistor for feeding said phasic error signal therethrough to said driving means when said transistor is rendered conductive.

9. A device according to claim 2, in which said second switching means comprises a transistor through which said reference signal is supplied to said charge storing means when said transistor is rendered conductive, said transistor being rendered conductive when the first-mentioned switching means is rendered non-conductive.

* * * * *